United States Patent
Peters et al.

(10) Patent No.: US 12,501,340 B2
(45) Date of Patent: Dec. 16, 2025

(54) DATA ROUTING BETWEEN DEVICES IN MESH NETWORKS

(71) Applicant: Sonos, Inc., Santa Barbara, CA (US)

(72) Inventors: Jeffrey M. Peters, Cambridge, MA (US); Steven Beckhardt, Boston, MA (US); Hrishikesh Gossain, Barbara, CA (US); Nicholas A. J. Millington, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 330 days.

(21) Appl. No.: 18/457,161

(22) Filed: Aug. 28, 2023

(65) Prior Publication Data

US 2023/0403230 A1 Dec. 14, 2023

Related U.S. Application Data

(63) Continuation of application No. 17/146,018, filed on Jan. 11, 2021, now Pat. No. 11,743,183, which is a (Continued)

(51) Int. Cl.
*H04W 40/08* (2009.01)
*H04L 45/00* (2022.01)
(Continued)

(52) U.S. Cl.
CPC .......... *H04W 40/08* (2013.01); *H04L 45/122* (2013.01); *H04L 45/18* (2013.01); *H04L 45/48* (2013.01); *H04L 45/70* (2013.01); *H04W 40/02* (2013.01)

(58) Field of Classification Search
None
See application file for complete search history.

(56) References Cited

U.S. PATENT DOCUMENTS

| 5,440,644 | A | 8/1995 | Farinelli et al. |
| 5,761,320 | A | 6/1998 | Farinelli et al. |

(Continued)

FOREIGN PATENT DOCUMENTS

| EP | 1389853 A1 | 2/2004 |
| JP | 2000078147 | 3/2000 |

(Continued)

OTHER PUBLICATIONS

Yamao et al., "Cross-Layer Multi-Hop Packet Transmission Scheme Incorporating Route-Shortcut and Bypass Functions", IEICE, 2010, 110(127), pp. 31-36.

(Continued)

*Primary Examiner* — Anh Ngoc M Nguyen

(57) ABSTRACT

A first mesh network device is configured to (i) identify a set of wireless communication paths for communication with a second mesh network device, (ii) based at least on a wireless signal strength, determine that a second wireless communication path, and not a first wireless communication path, is to be used for communication with the second mesh network device, (iii) join a synchrony group comprising the first and second mesh network devices, (iv) obtain audio content that is to be played back in synchrony by the synchrony group, (v) transmit the audio content to the second mesh network device over the second wireless communication path; (vi) play back, using an audio amplifier of the first mesh network device, the audio content; and (vii) cause the second mesh network device to play back the audio content in synchrony with the playback of the audio content by the first mesh network device.

20 Claims, 9 Drawing Sheets

Related U.S. Application Data continuation of application No. 16/577,742, filed on Sep. 20, 2019, now Pat. No. 10,892,988, which is a continuation of application No. 15/286,842, filed on Oct. 6, 2016, now Pat. No. 10,425,329, which is a continuation of application No. 13/468,913, filed on May 10, 2012, now Pat. No. 9,521,074.

(51) Int. Cl.
  *H04L 45/122* (2022.01)
  *H04L 45/18* (2022.01)
  *H04L 45/48* (2022.01)
  *H04W 40/02* (2009.01)

(56) References Cited

U.S. PATENT DOCUMENTS

| | | | |
|---|---|---|---|
| 5,923,902 A | 7/1999 | Inagaki | |
| 6,032,202 A | 2/2000 | Lea et al. | |
| 6,256,554 B1 | 7/2001 | DiLorenzo | |
| 6,317,789 B1 | 11/2001 | Rakavy et al. | |
| 6,366,582 B1 | 4/2002 | Nishikado et al. | |
| 6,404,811 B1 | 6/2002 | Cvetko et al. | |
| 6,469,633 B1 | 10/2002 | Wachter | |
| 6,522,886 B1 * | 2/2003 | Youngs | H04W 72/30 455/519 |
| 6,611,537 B1 | 8/2003 | Edens et al. | |
| 6,628,661 B1 | 9/2003 | Goldman et al. | |
| 6,631,410 B1 | 10/2003 | Kowalski et al. | |
| 6,757,517 B2 | 6/2004 | Chang | |
| 6,778,869 B2 | 8/2004 | Champion | |
| 6,801,529 B1 | 10/2004 | McGrane et al. | |
| 7,130,608 B2 * | 10/2006 | Hollstrom | H04M 1/72403 455/403 |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,668,925 B1 | 2/2010 | Liao et al. | |
| 7,853,341 B2 | 12/2010 | McCarty et al. | |
| 7,949,727 B2 | 5/2011 | Jensen | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | Mccarty et al. | |
| 8,234,395 B2 | 7/2012 | Millington | |
| 8,483,853 B1 | 7/2013 | Lambourne | |
| 8,538,564 B2 | 9/2013 | Almstrand et al. | |
| 8,572,224 B2 | 10/2013 | Hite et al. | |
| 9,425,985 B1 | 8/2016 | Shousterman et al. | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2003/0157951 A1 | 8/2003 | Hasty, Jr. | |
| 2003/0231608 A1 | 12/2003 | Wentink | |
| 2004/0024478 A1 | 2/2004 | Hans et al. | |
| 2005/0135304 A1 | 6/2005 | Wentink et al. | |
| 2006/0209785 A1 | 9/2006 | Iovanna et al. | |
| 2007/0091871 A1 | 4/2007 | Taha et al. | |
| 2007/0142944 A1 | 6/2007 | Goldberg et al. | |
| 2008/0089299 A1 | 4/2008 | Lindsley et al. | |
| 2008/0219185 A1 | 9/2008 | Zou et al. | |
| 2008/0240112 A1 | 10/2008 | Muqattash et al. | |
| 2009/0185492 A1 | 7/2009 | Senarath et al. | |
| 2010/0040007 A1 | 2/2010 | Itagaki et al. | |
| 2010/0142445 A1 | 6/2010 | Schlicht et al. | |
| 2010/0172267 A1 * | 7/2010 | Viorel | H04B 7/022 370/254 |
| 2010/0261479 A1 | 10/2010 | Hidaka | |
| 2010/0317284 A1 | 12/2010 | Charbit et al. | |
| 2011/0116413 A1 | 5/2011 | Arai | |
| 2012/0058727 A1 | 3/2012 | Cook et al. | |
| 2012/0201179 A1 | 8/2012 | Das et al. | |
| 2012/0230510 A1 | 9/2012 | Dinescu et al. | |
| 2013/0031217 A1 | 1/2013 | Rajapakse | |

FOREIGN PATENT DOCUMENTS

| | | |
|---|---|---|
| JP | 2002124956 | 4/2002 |
| JP | 2002300169 | 10/2002 |
| JP | 2008172706 | 7/2008 |
| JP | 2009089042 | 4/2009 |
| JP | 2009094692 | 4/2009 |
| WO | 200153994 | 7/2001 |
| WO | 2002032058 | 4/2002 |
| WO | 2003093950 A2 | 11/2003 |

OTHER PUBLICATIONS

Advisory Action mailed on Mar. 21, 2016, issued in connection with U.S. Appl. No. 13/468,913, filed May 10, 2012, 3 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Chinese Patent Office, First Office Action mailed on Jul. 25, 2016, issued in connection with CN Application No. 201380024446.1, 9 pages.
Chinese Patent Office, Office Action mailed on Mar. 7, 2017, issued in connection with Chinese Application No. 201380024446.1, 14 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Extended Search Report mailed on Nov. 16, 2015, issued in connection with European Application No. 13787337.8, 6 pages.
European Patent Office, European Extended Search Report mailed on Jun. 9, 2020, issued in connection with European Application No. 20162984.7, 6 pages.
European Patent Office, European Office Action mailed on Mar. 21, 2019, issued in connection with European Application No. 13787337.8, 7 pages.
European Patent Office, European Office Action mailed on Sep. 27, 2018, issued in connection with European Application No. 137873378, 5 pages.
Final Office Action mailed on Jan. 14, 2016, issued in connection with U.S. Appl. No. 13/468,913, filed May 10, 2012, 18 pages.
Final Office Action mailed on Jan. 21, 2015, issued in connection with U.S. Appl. No. 13/468,913, filed May 10, 2012, 12 pages.
International Bureau, International Preliminary Report on Patentability, mailed on Nov. 20, 2014, issued in connection with InternationalApplication No. PCT/US2013/039494, filed on May 3, 2013, 8 pages.
International Searching Authority, International SearchReport and Written Opinion mailed on Aug. 21, 2013, issued in connection withInternational Application No. PCT/US2013/039494, filed on May 3, 2013, 12 pages.
Japanese Patent Office, Notice of Rejection mailed on Dec. 1, 2015, issued in connection with Japanese Application No. 2015-511555, 6 pages.
Japanese Patent Office, Office Action mailed on Jul. 19, 2016, issued in connection with Japanese Application No. 2015-511555, 8 pages.
Japanese Patent Office, Office Action mailed on Jan. 24, 2017, issued in connection with Japanese Patent Application No. 2015-511555, 7 pages.

(56) References Cited

OTHER PUBLICATIONS

Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action mailed on Dec. 13, 2018, issued in connection with U.S. Appl. No. 15/286,842, filed Oct. 6, 2016, 13 pages.
Non-Final Office Action mailed on Sep. 18, 2014, issued in connection with U.S. Appl. No. 13/468,913, filed May 10, 2012, 14 pages.
Non-Final Office Action mailed on May 28, 2015, issued in connection with U.S. Appl. No. 13/468,913, filed May 10, 2012, 11 pages.
Non-Final Office Action mailed on Dec. 6, 2022, issued in connection with U.S. Appl. No. 17/146,018, filed Jan. 11, 2021, 17 pages.
Non-Final Office Action mailed on Jul. 9, 2020, issued in connection with U.S. Appl. No. 16/577,742, filed Sep. 20, 2019, 28 pages.
Notice of Allowance mailed on Jul. 7, 2016, issued in connection with U.S. Appl. No. 13/468,913, filed May 10, 2012, 6 pages.
Notice of Allowance mailed on May 15, 2019, issued in connection with U.S. Appl. No. 15/286,842, filed Oct. 6, 2016, 5 pages.
Notice of Allowance mailed on Nov. 18, 2020, issued in connection with U.S. Appl. No. 16/577,742, filed Sep. 20, 2019, 5 pages.
Notice of Allowance mailed on Apr. 5, 2023, issued in connection with U.S. Appl. No. 17/146,018, filed Jan. 11, 2021, 5 pages.
Palm, Inc., "Handbook for the Palm VII Handheld," May 2000, 311 pages.
Presentations at WinHEC 2000, May 2000, 138 pages.
Sonos, "Sonos Connect (Formerly ZonePlayer 90) Product Guide," 2004-2011, 14 pages.
Sonos, "Sonos Control Product Guide," 2004-2011, 36 pages.
Sonos, "Sonos Controller for Android Product Guide," 2004-2012, 50 pages.
Sonos, "Sonos Controller for iPad Product Guide," 2004-2011, 45 pages.
Sonos, "Sonos Controller for iPhone Product Guide," 2004-2011, 45 pages.
Sonos, "Sonos Controller for Mac or PC Product Guide," 2004-2012, 97 pages.
Sonos, "Sonos Play: 3 Product Guide," 2004-2011, 14 pages.
Sonos, "Sonos Play: 5 (Formerly S5) Product Guide," 2004-2011, 14 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

\* cited by examiner

DATA ROUTING BETWEEN DEVICES IN MESH NETWORKS

CROSS REFERENCE TO RELATED APPLICATIONS

This application claims the benefit of priority as a continuation under 35 U.S.C. § 120 to U.S. application Ser. No. 17/146,018 filed Jan. 11, 2021, entitled "Methods and Apparatus for Direct Routing Between Nodes of Networks," which is a continuation of U.S. application Ser. No. 16/577,742 filed Sep. 20, 2019, entitled "Methods and Apparatus for Direct Routing Between Nodes of Networks," now U.S. Pat. No. 10,892,988, which is a continuation of U.S. application Ser. No. 15/286,842 filed Oct. 6, 2016, entitled "Methods and Apparatus for Direct Routing Between Nodes of Networks," now U.S. Pat. No. 10,425,329, which is a continuation of U.S. application Ser. No. 13/468,913 filed May 10, 2012, entitled "Methods and Apparatus for Direct Routing Between Nodes of Networks," now U.S. Pat. No. 9,521,074, the contents of each of which are hereby incorporated by reference in their entirety for all purposes.

FIELD OF THE DISCLOSURE

The disclosure is related to consumer electronics and, more particularly, to methods and apparatus for direct routing between nodes of networks.

BACKGROUND

Technological advancements have increased the accessibility of music content, as well as other types of media, such as television content, movies, and interactive content. For example, a user can access audio, video, or both audio and video content over the Internet through an online store, an Internet radio station, an online music service, an online movie service, and the like, in addition to the more traditional avenues of accessing audio and video content. Demand for such audio and video content continues to surge. Given the high demand, technology used to access and play such content has likewise improved.

BRIEF DESCRIPTION OF THE DRAWINGS

Features, aspects, and advantages of the presently disclosed technology are better understood with regard to the following description, appended claims, and accompanying drawings where:

Figure 1:
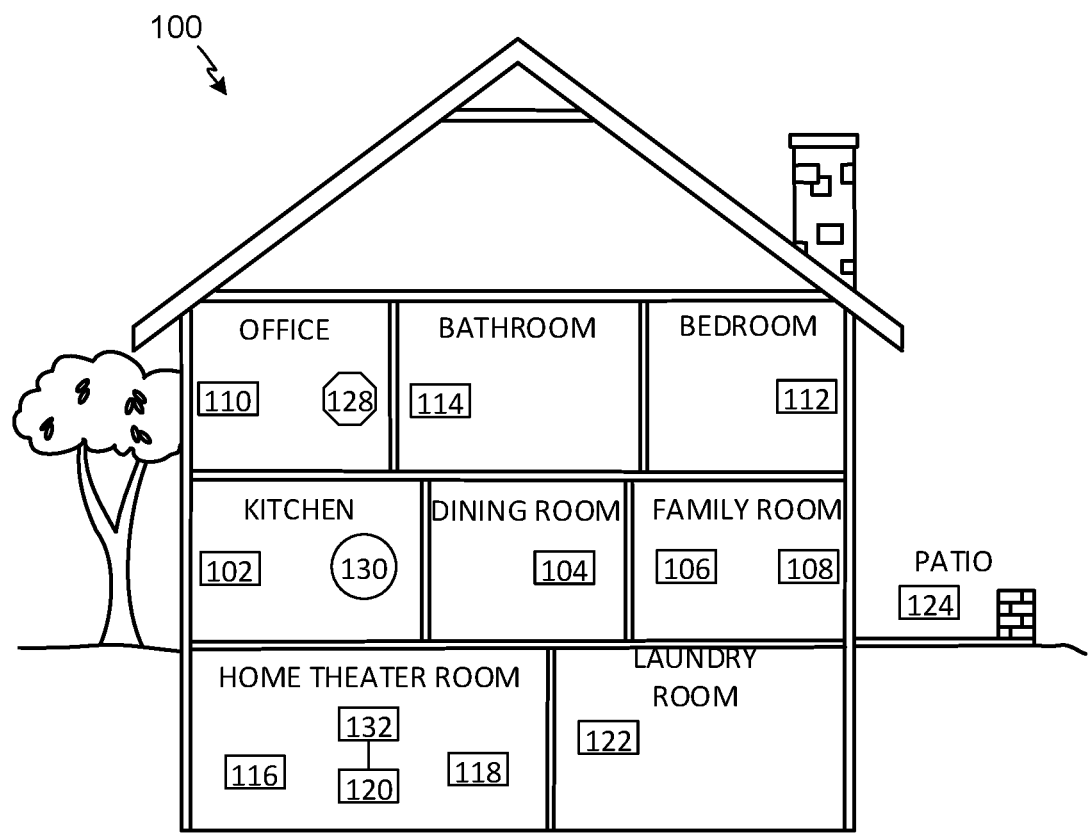
FIG. 1 shows an illustration of an example system in which embodiments of the methods and apparatus disclosed herein can be implemented.

In addition, the drawings are for the purpose of illustrating example embodiments, but it is understood that the present disclosure is not limited to the arrangements and instrumentality shown in the drawings.

DETAILED DESCRIPTION

I. Overview

A wired and/or wireless network is sometimes established to facilitate communication among a group of devices. For example, a wired or wireless network can be used to place multimedia playback devices of a home in communication with a playback network (e.g., a home music system). In some instances, the playback network is implemented and/or configured according to a protocol, such as a spanning tree protocol (STP). The protocol governs the manner in which devices are added and/or deleted from the network and the manner in which the devices communicate with each other. Some network protocols, such as STP, restrict communication capabilities of some devices. For example, a first device (e.g., represented as a node in a network configuration) of an STP network may be blocked from sending data directly to a second device of the STP network. In other words, the first device of the example STP network is required to send data destined for the second node through an intermediary device (e.g., a root node). Conventional STP networks prevent such direct communication to, for example, prevent routing loops, which are described in detail below. Devices of a network that are restricted by a governing protocol from communicating directly with certain other devices of the network are referred to herein as "blocked." That is, when the protocol prohibits the first device of the network from directly routing data to the second device, the direct routing (or direct link) between the first and second devices is said to be blocked by the governing network protocol.

Example methods, apparatus, systems, and articles of manufacture disclosed herein provide devices an ability to directly route data to neighboring devices despite the protocol designation of the link as "blocked." As described in greater detail below, example methods, apparatus, systems, and articles of manufacture disclosed herein create a direct routing path between a first device and a second device where the first device is otherwise blocked (e.g., according to a designation of the governing protocol) from routing data to the second device. The direct route provided by the example methods, apparatus, systems, and articles of manufacture disclosed herein enables the first device to bypass the indirect forwarding route established by the governing protocol, thereby transmitting the forwarded information to a destination device faster and with less network congestion. In some examples, the direct route provided by the example methods, apparatus, systems, and articles of manufacture disclosed herein is used in connection with forwarding data (e.g., frames) of a certain type of frame, such as frames having a threshold quality of service (QoS) characteristic(s).

In some examples disclosed herein, one or more characteristics indicative of connection between the first and second devices is monitored. For example, wireless signal-to-noise level (SNR), also referred to as signal strength indicator (SSI), between the first and second devices is monitored to determine a health and/or a measure of reliability of the direct link between the first and second devices. In some examples disclosed herein, if the monitored characteristic(s) indicate a weakness of the connection, the direct routing between the otherwise blocked devices is disabled. As a result, the first device communicates with the second device in accordance with the governing protocol's "blocked" designation until the monitored characteristic(s) indicate that the connection between the first and second devices has returned to a healthy, reliable state.

Certain embodiments provide a method including identifying a destination node of first data received at a first node; calculating a logical distance from the first node to the destination node; and when the logical distance meets a threshold condition and when a direct route from the first node to the destination node is blocked according to a protocol setting, overriding the protocol setting to enable transmission of the first data from the first node to the destination node via the direct route.

Certain embodiments provide a media playback device including an analyzer to determine whether a configuration data structure of the media playback device includes a port linked to a destination address of a received data packet, wherein the configuration data structure complies with a network protocol; and an overrider to, when the configuration data structure includes the port linked to the destination address and when the port corresponds to a wireless link, override a blocking setting of the network protocol to enable a direct routing of the data packet from the media playback device to a second media playback device associated with the destination address.

Certain embodiments provide a tangible computer readable storage medium comprising instructions that, when executed, cause a machine to calculate a logical distance between a first node and a destination node of a communication received at the first node; determine a wireless signal strength of a direct link between the first node and the destination node, wherein the direct link is blocked by a network setting associated with the first node; and enable transmission of the received communication from the first node to the destination node via the direct link when the logical distance meets a condition and when the wireless signal strength is greater than a threshold.

Although the following discloses example systems, methods, apparatus, and articles of manufacture including, among other components, firmware and/or software executed on hardware, it should be noted that such subsystems, methods, apparatus, and/or articles of manufacture are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

Reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

These embodiments and many additional embodiments are described more below. Further, the detailed description is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments.

II. Example Environment

Referring now to the drawings, in which like numerals can refer to like parts throughout the figures, FIG. 1 shows an example system configuration 100 in which one or more of the method and/or apparatus disclosed herein can be practiced or implemented. By way of illustration, the system configuration 100 represents a home with multiple zones. Each zone, for example, represents a different room or space, such as an office, bathroom, bedroom, kitchen, dining room, family room, home theater room, utility or laundry room, and patio. While not shown here, a single zone can cover more than one room or space. One or more of zone players 102-124 are shown in each respective zone. A zone player 102-124, also referred to as a playback device, multimedia unit, speaker, and so on, provides audio, video, and/or audiovisual output. A controller 130 (e.g., shown in the kitchen for purposes of illustration) provides control to the system configuration 100. The system configuration 100 illustrates an example whole house audio system, though it is understood that the technology described herein is not limited to its particular place of application or to an expansive system like a whole house audio system 100 of FIG. 1.

Figure 2A:
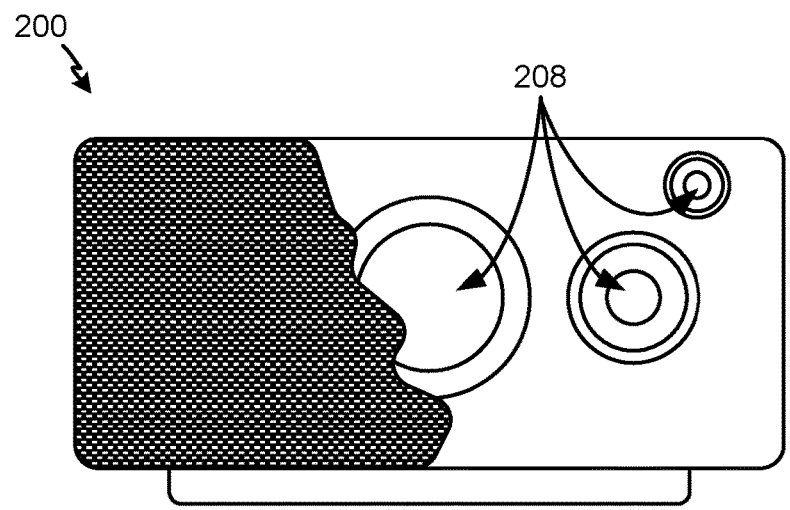
FIG. 2A shows an illustration of an example zone player having a built-in amplifier and speakers.
Figure 2B:
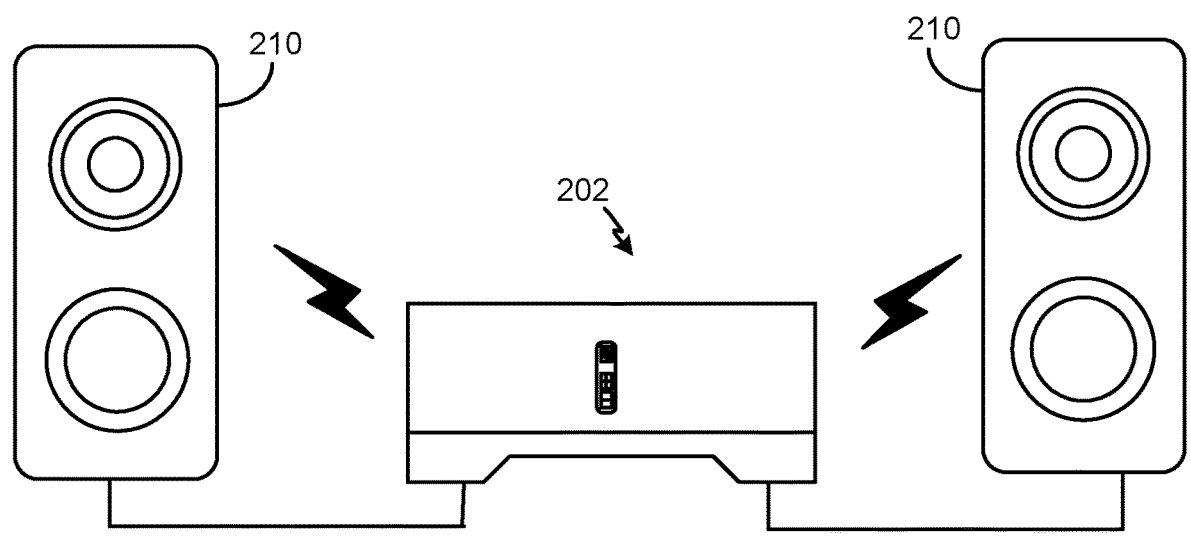
FIG. 2B shows an illustration of an example zone player having a built-in amplifier and connected to external speakers.
Figure 2C:
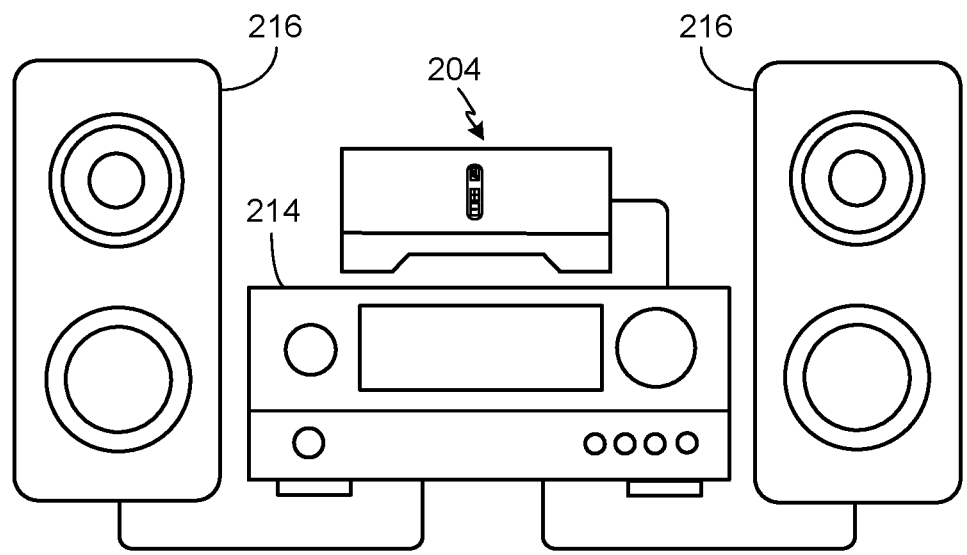
FIG. 2C shows an illustration of an example zone player connected to an A/V receiver and speakers.

FIGS. 2A, 2B, and 2C show example illustrations of zone players 200-204. The zone players 200-204 of FIGS. 2A, 2B, and 2C, respectively, can correspond to any of the zone players 102-124 of FIG. 1. While certain embodiments provide multiple zone players, an audio output can be generated using only a single zone player. FIG. 2A illustrates a zone player 200 including sound producing equipment 208 capable of generating sound or an audio output corresponding to a signal received (e.g., wirelessly and/or via a wired interface). The sound producing equipment 208 of the zone player 200 of FIG. 2A includes a built-in amplifier (not shown in this illustration) and speakers (e.g., a tweeter, a mid-range driver, and/or a subwoofer. In certain embodiments, the zone player 200 of FIG. 2A can be configured to play stereophonic audio or monaural audio. In some embodiments, the zone player 200 of FIG. 2A can be configured as a component in a combination of zone players to play stereophonic audio, monaural audio, and/or surround audio. As described in greater detail below, in some embodiments, the example zone player 200 of FIG. 2A can also transmit a second signal to, for example, other zone player(s) in the same or different zone(s), speaker(s), receiver(s), and so on. Transmission of the second signal can be part of, for example, a system in which multiple zone players, speakers, receivers, and so on, form a network to, for example, present media content in a synchronization or distributed manner.

The example zone player 202 of FIG. 2B includes a built-in amplifier (not shown in this illustration) to power a set of detached speakers 210. The speakers 210 of FIG. 2B can include, for example, any type of loudspeaker. The zone player 202 of FIG. 2B can communicate a signal corresponding to audio content to the detached speakers 210 via wired and/or wireless channels. Instead of receiving and generating audio content as in FIG. 2A, the zone player 202 of FIG. 2B receives the audio content and transmits the same (e.g., after processing the received signal) to the detached speakers 210. Similar to the example zone player 200 of FIG. 2A, in some embodiments the zone player 202 can transmit a second signal to, for example, other zone player(s) in the same or different zone(s), speaker(s), receiver(s), and so on.

The example zone player 204 of FIG. 2C does not include an amplifier, but allows a receiver 214, or another audio and/or video type device with built-in amplification, to connect to a data network 128 of FIG. 1 and to play audio received over the data network 128 via the receiver 214 and a set of detached speakers 216. In addition to the wired couplings shown in FIG. 2C, the detached speakers 216 can receive audio content via a wireless communication channel between the detached speakers 216 and, for example, the zone player 204 and/or the receiver 214. In some embodiments, the zone player 204 can transmit a second signal to, for example, other zone player(s) in the same or different zone(s), speaker(s), receiver(s), and so on.

Example zone players include a "Sonos® S5," "Sonos Play:5," "Sonos Play:3," "ZonePlayer 120," and "ZonePlayer 90," which are offered by Sonos, Inc. of Santa Barbara, California. Any other past, present, and/or future zone players can additionally or alternatively be used to implement the zone players of example embodiments disclosed herein. A zone player can also be referred to herein as a playback device, and a zone player is not limited to the particular examples illustrated in FIGS. 2A, 2B, and 2C. For example, a zone player can include a wired or wireless headphone. In other examples, a zone player might include a subwoofer. In yet other examples, a zone player can include a sound bar. In an example, a zone player can include or interact with a docking station for an Apple iPod™ or similar device. In some embodiments, a zone player can relay one or more signals received from, for example, a first zone player to another playback device. In some embodiments, a zone player can receive a first signal and generate an output corresponding to the first signal and, simultaneously or separately, can receive a second signal and transmit or relay the second signal to another zone player(s), speaker(s), receiver(s), and so on. Thus, an example zone player described herein can act as a playback device and, at the same time, operate as a hub in a network of zone players. In such instances, media content corresponding to the first signal can be different from the media content corresponding to the second signal.

Figure 3:
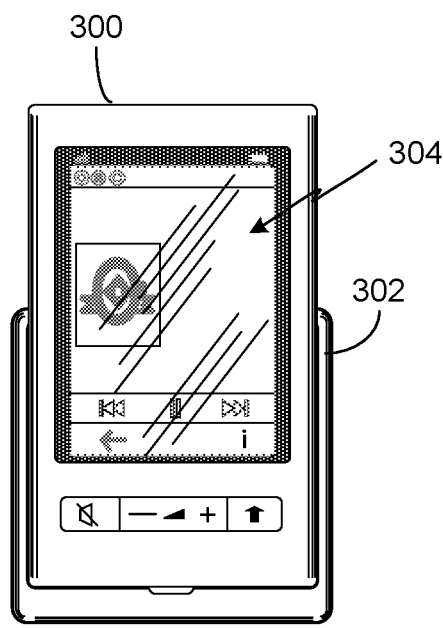
FIG. 3 shows an illustration of an example controller.

FIG. 3 shows an example illustration of a wireless controller 300 in a docking station 302. The controller 300 can correspond to the controlling device 130 of FIG. 1. The controller 300 is provided with a touch screen 304 that allows a user to interact with the controller 300, for example, to retrieve and navigate a playlist of audio items, control operations of one or more zone players, and provide overall control of the system configuration 100. In certain embodiments, any number of controllers can be used to control the system configuration 100. In certain embodiments, there can be a limit on the number of controllers that can control the system configuration 100. The controllers might be wireless like wireless controller 300 or wired to the data network 128. Furthermore, an application running on any network-enabled portable devices, such as an iPhone™, iPad™, Android™ powered phone, or any other smart phone or network-enabled device can be used as a controller by connecting to the data network 128. An application running on a laptop or desktop PC or Mac can also be used as a controller. Example controllers include a "Sonos® Controller 200," "Sonos® Controller for iPhone," "Sonos® Controller for iPad," "Sonos® Controller for Android," "Sonos® Controller for Mac or PC," which are offered by Sonos, Inc. of Santa Barbara, California. The flexibility of such an application and its ability to be ported to a new type of portable device is advantageous.

Referring back to the system configuration 100 of FIG. 1, a particular zone can contain one or more zone players. For example, the family room of FIG. 1 contains two zone players 106 and 108, while the kitchen is shown with one zone player 102. Zones can be dynamically configured by positioning a zone player in a room or space and assigning via the controller 130 the zone player to a new or existing zone. As such, zones can be created, combined with another zone, removed, and given a specific name (e.g., "Kitchen"), if so programmed. The zone players 102 to 124 are coupled directly or indirectly to a data network, such as the data network 128 shown in FIG. 1. The data network 128 is represented by an octagon in the figure to stand out from other components shown in the figure. While the data network 128 is shown in a single location, it is understood that such a network can be distributed in and around the system configuration 100.

Particularly, the data network 128 can be a wired network, a wireless network, or a combination of both. In some embodiments, one or more of the zone players 102-124 are wirelessly coupled to the data network 128 based on a proprietary mesh network. In some embodiments, one or more of the zone players 102-124 are wirelessly coupled to the data network 128 using a non-mesh topology. In some embodiments, one or more of the zone players 102-124 are coupled via a wire to the data network 128 using Ethernet or similar technology. In addition to the one or more zone players 102-124 connecting to the data network 128, the data network 128 can further allow access to a wide area network, such as the Internet.

In certain embodiments, the data network 128 can be created by connecting any of the zone players 102-124, or some other connecting device, to a broadband router. Other zone players 102-124 can then be added wired or wirelessly to the data network 128. For example, a zone player (e.g., any of zone players 102-124) can be added to the system configuration 100 by simply pressing a button on the zone player itself, which enables a connection to be made to the data network 128. The broadband router can be connected to an Internet Service Provider (ISP), for example. The broadband router can be used to form another data network within the system configuration 100, which can be used in other applications (e.g., web surfing). The data network 128 can also be used in other applications, if so programmed. Further, in certain embodiments, the data network 128 is the same network used for other applications in the household.

In certain embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly listening to the audio. Further, zones can be put into a "party mode" such that all associated zones will play audio in synchrony.

In certain embodiments, a zone contains two or more zone players. For example, the family room contains two zone players 106 and 108, and the home theater room contains at least zone players 116, 118, and 120. A zone can be configured to contain as many zone players as desired, and for example, the home theater room might contain additional zone players to play audio from a 5.1 channel or greater audio source (e.g., a movie encoded with 5.1 or greater audio channels). If a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players can play audio in synchrony with other zone players.

In certain embodiments, three or more zone players can be configured to play various channels of audio that is encoded with three channels or more sound. For example, the home theater room shows zone players 116, 118, and 120. If the sound is encoded as 2.1 channel audio, then the zone player 116 can be configured to play left channel audio, the zone player 118 can be configured to play right channel audio, and the zone player 120 can be configured to play bass frequencies. Other configurations are possible and depend on the number of zone players and the type of audio. Further, a particular zone can be configured to play a 5.1 channel audio in one instance, such as when playing audio from a movie, and then dynamically switch to play stereo, such as when playing audio from a two channel source.

In certain embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device is preferably set in a consolidated mode.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

Sources of audio content to be played by zone players 102-124 are numerous. Music from a personal library stored on a computer or networked-attached storage (NAS) can be accessed via the data network 128 and played. Internet radio stations, shows, and podcasts can be accessed via the data network 128. Music services that let a user stream and download music and audio content can be accessed via the data network 128. Further, music can be obtained from traditional sources, such as a turntable or CD player, via a line-in connection to a zone player, for example. Audio content can also be accessed through AirPlay™ wireless technology by Apple, Inc., for example. Audio content received from one or more sources can be shared amongst the zone players 102 to 124 via the data network 128 and/or the controller 130. The above-disclosed sources of audio content are referred to herein as network-based audio information sources. However, network-based audio information sources are not limited thereto.

The example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Example Playback Device

Figure 4:
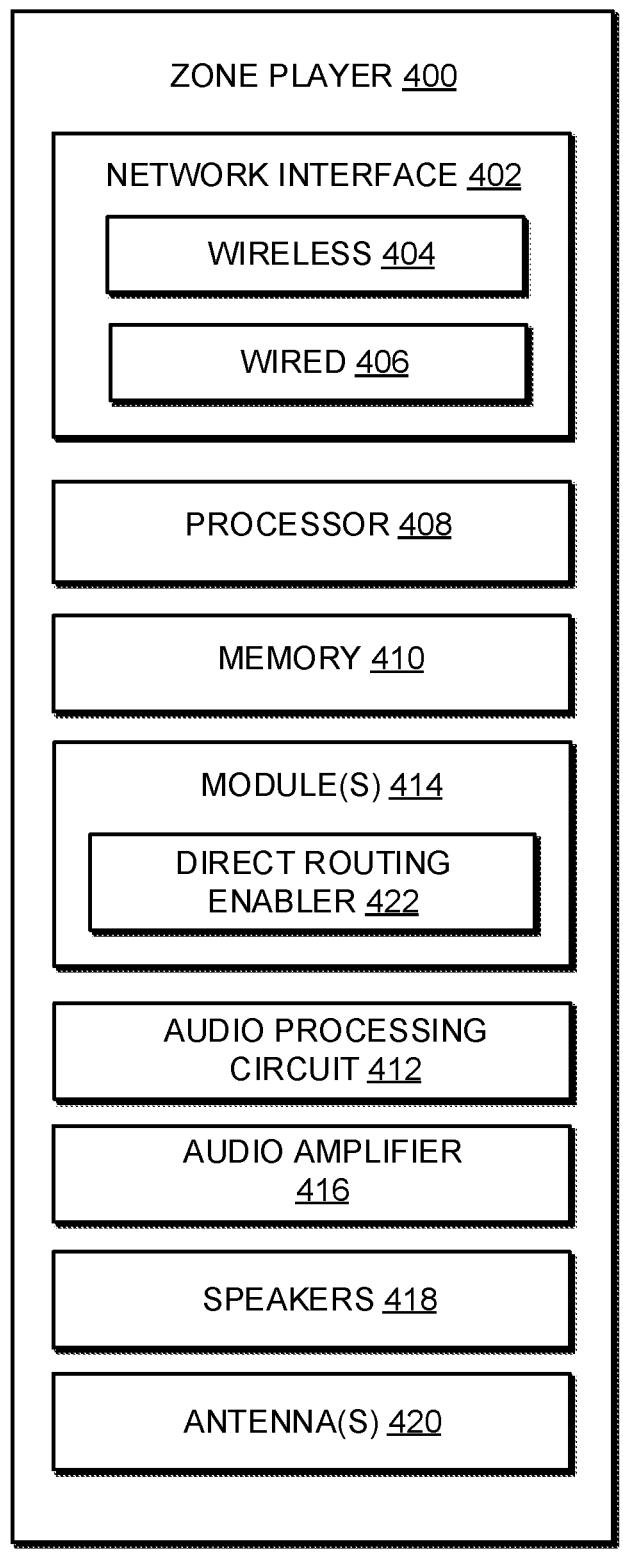
FIG. 4 shows an internal functional block diagram of an example zone player.

Referring now to FIG. 4, there is shown an example functional block diagram of a zone player 400 in accordance with an embodiment. The zone player 400 of FIG. 4 includes a network interface 402, a processor 408, a memory 410, an audio processing component 412, one or more modules 414, an audio amplifier 416, and a speaker unit 418 coupled to the audio amplifier 416. In the illustrated example of FIG. 4, the module(s) 414 include a direct routing enabler 422 constructed in accordance with the teachings of this disclosure. The example direct enabler 422 is described in detail below in connection with FIGS. 6-9. FIG. 2A shows an example illustration of such a zone player. Other types of zone players can not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a lamp for indoor or outdoor use.

Referring back to FIG. 4, the network interface 402 facilitates a data flow between zone players and other devices on a data network (e.g., the data network 128 of FIG. 1) and the zone player 400. In some embodiments, the network interface 402 can manage the assembling of an audio source or file into smaller packets that are to be transmitted over the data network or reassembles received packets into the original source or file. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, the network interface 402 can include one or both of a wireless interface 404 and a wired interface 406. Additionally or alternatively, the example zone player 400 of FIG. 4 can include multiple wired interfaces and/or multiple wireless interfaces. The wireless interface 404, also referred to as an RF interface, provides network interface functions for the zone player 400 to wirelessly communicate with other devices (e.g., other zone player(s), speaker(s), receiver(s), component(s) associated with the data network 128, and so on) in accordance with a communication protocol (e.g., any of the wireless standards IEEE 802.11a, 802.11b, 802.11g, 802.11n, or 802.15). To receive wireless signals and to provide the wireless signals to the wireless interface 404 and to transmit wireless signals, the zone player 400 of FIG. 4 includes one or more antennas 420. The wired interface 406 provides network interface functions for the zone player 400 to communicate over a wire with other devices in accordance with a communication protocol (e.g., IEEE 802.3). In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine readable medium storing instructions that can be executed by the processor 408. In some embodiments, a task might be for the zone player 400 to retrieve audio data from another zone player or a device on a network. In some embodiments, a task might be for the zone player 400 to send audio data to another zone player or device on a network. In some embodiments, a task might be for the zone player 400 to synchronize playback of audio with one or more additional zone players. In some embodiments, a task might be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In certain embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for play back through speakers 418. In addition, the audio processing component 412 can include necessary circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (for low frequencies), a mid-range driver (middle frequencies), and a tweeter (high frequencies), for example. An enclosure can be sealed or ported, for example.

A zone player 400 can also be referred to herein as a playback device. An example playback device includes a Sonos ° Play:5, which is manufactured by Sonos, Inc. of Santa Barbara, California. The Play:5 is an example zone player with a built-in amplifier and speakers. In particular, the Play:5 is a five-driver speaker system that includes two tweeters, two mid-range drivers, and one subwoofer. When playing audio content via the Play:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies, just from different channels of audio. Audio from Internet radio stations, online music and video services, downloaded music, analog audio inputs, television, DVD, and so on, can be played from a Sonos ° Play:5. While the Play:5 is an example of a zone player with speakers, it is understood that a zone player with speakers is not limited to one with a certain number of speakers (e.g., five speakers as in the Play:5), but rather can contain one or more speakers. Further, a zone player can be part of another device, which might even serve a purpose different than audio (e.g., a lamp).

IV. Example Controller

Figure 5:
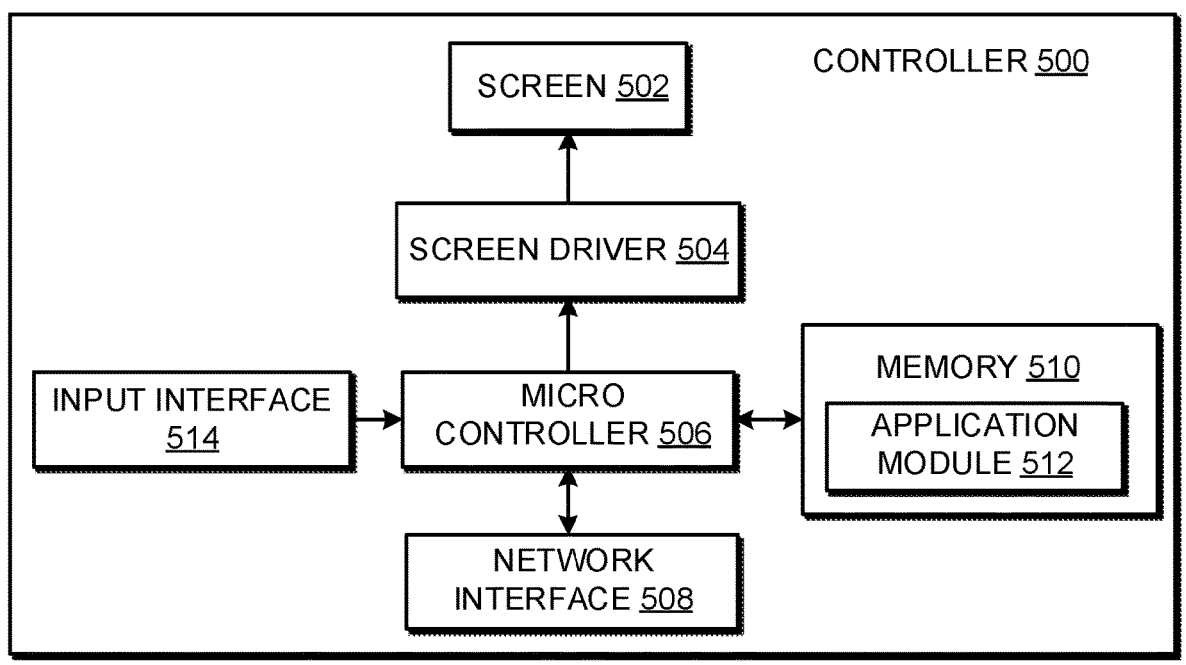
FIG. 5 shows an internal functional block diagram of an example controller.

Referring now to FIG. 5, there is shown an example controller 500, which can correspond to the controlling device 130 in FIG. 1. The controller 500 can be used to facilitate the control of multi-media applications, automation and others in a system. In particular, the controller 500 is configured to facilitate a selection of a plurality of audio sources available on the network and enable control of one or more zone players (e.g., the zone players 102-124 in FIG. 1) through a wireless network interface 508. According to one embodiment, the wireless communications is based on an industry standard (e.g., infrared, radio, wireless standards IEEE 802.11a, 802.11b 802.11g, 802.11n, or 802.15). Further, when a particular audio is being accessed via the controller 500 or being played via a zone player, a picture (e.g., album art) or any other data, associated with the audio source can be transmitted from a zone player or other electronic device to the controller 500 for display.

The controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio play back. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system. Further, a controller can be integrated into a zone player.

It should be noted that other network-enabled devices such as an iPhone®, iPad® or any other smart phone or network-enabled device (e.g., a networked computer such as a PC or Mac®) can also be used as a controller to interact or control zone players in a particular environment. In some embodiments, a software application or upgrade can be downloaded onto a network enabled device to perform the functions described herein.

In certain embodiments, a user can create a zone group including at least two zone players from the controller 500. The zone players in the zone group can play audio in a synchronized fashion, such that all of the zone players in the zone group play back an identical audio source or a list of identical audio sources in a synchronized manner such that no (or substantially no) audible delays or hiccups could be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would need to manually and individually link each zone. The single command might include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Example Network Configuration

Figure 6:
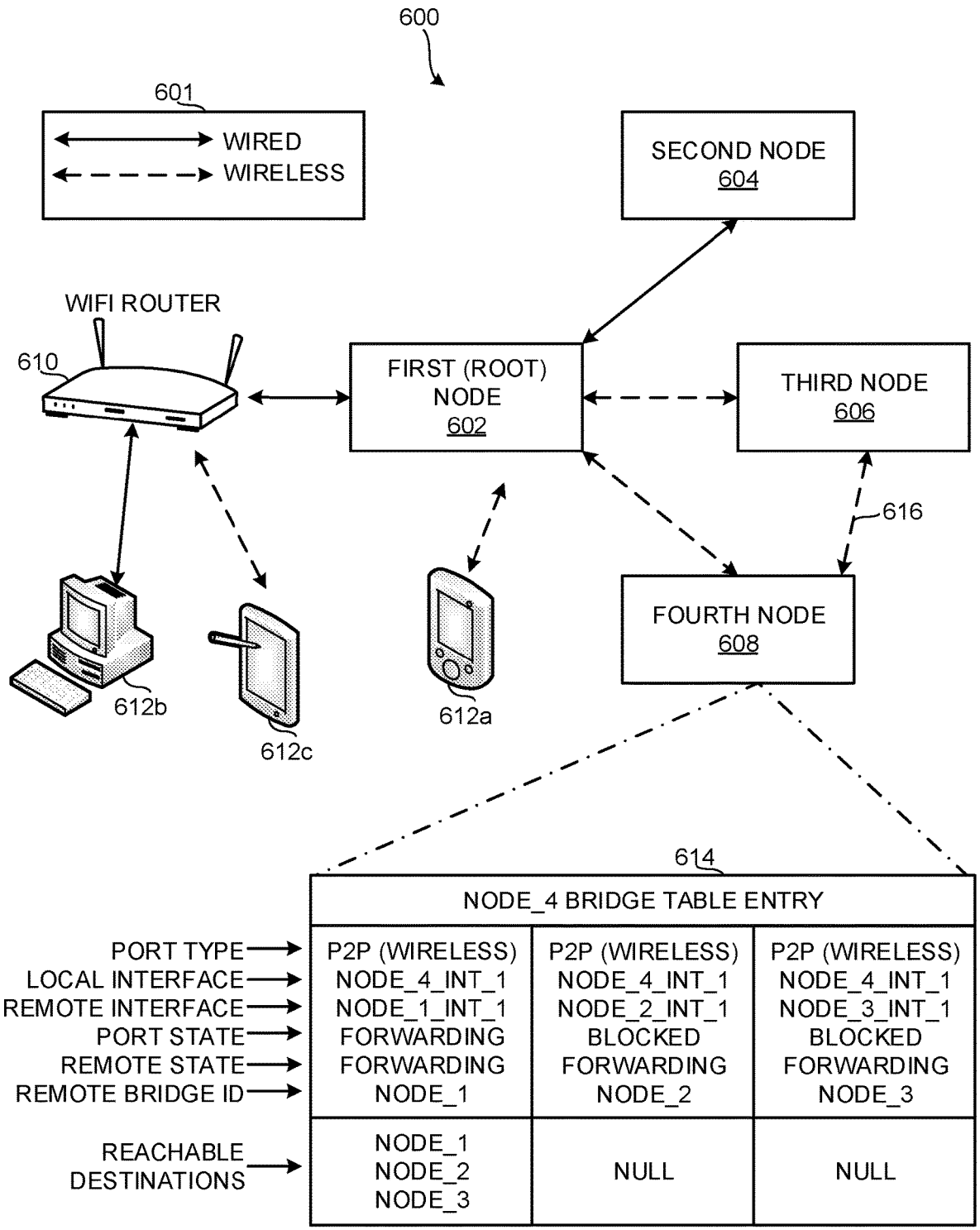
FIG. 6 shows an example network configuration.

Certain particular examples will now be provided in connection with FIGS. 6-9 to describe, for purposes of illustration only, certain apparatus and methods to provide and facilitate direct communication between nodes of a network. FIG. 6 shows an example network 600 in which example methods and apparatus disclosed herein may be implemented. The example network 600 of FIG. 6 supports a combination of wired and wireless links and/or interfaces, as shown in the legend 601. The example network 600 includes four nodes 602, 604, 606 and 608 and a router 610. In the illustrated example, the nodes 602-608 correspond to media playback devices, such as the zone players of FIGS. 1, 2A-C, and/or 4. However, example methods and apparatus disclosed herein can be implemented in connection with any suitable type of device represented by the nodes 602-608 of FIG. 6. The example router 610 is a WiFi router that supports both wired and wireless communication. However, additional or alternative type(s) of routers can be utilized to facilitate communication in the network 600. In the illustrated example, the first node 602 is in communication with the router 610 and the second node 604 via wired connections. Further, the first node 602 is in communication with the third node 606 and the fourth node 608 via wireless connections. As described in greater detail below, the nodes 602-608 are in communication with each other via one or more forwarding techniques and/or configurations.

The example nodes 602-608 are controlled using any one of a plurality of controllers 612a-c. A first one of the controllers 612a is implemented by a smart phone (e.g., an Android® smart phone, an iPhone®, etc.). A second one of the controllers 612b is a desktop computer. A third one of the controllers 612c is a tablet device (e.g., an iPad®). The example controllers 612a-c of FIG. 6 correspond to, for example, the example controller 300 of FIG. 3. The example controllers 612a-c of FIG. 6 implement an application configured to control the example nodes 602-608. The example controller 612a of FIG. 6 communicates with the nodes 602-608 via a direction communication with node 608. The example controllers 612b-c of FIG. 6 communicate with the nodes 602-608 via the example router 610.

Using the example network 600, the nodes 602-608 can share or exchange one or more audio sources and be grouped to play the same or different audio sources. Additionally or alternatively, audio sources can be placed in direct communication with the nodes 602-608. In some examples, the first node 602 and the second node 604 are grouped to playback one piece of music, and at the same time, the third node 606 plays back another piece of music. In other words, the nodes 602-608, as shown in FIG. 6, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service.

The example network 600 of FIG. 6 utilizes a mesh networking topology to place the nodes 602-608 in communication with each other. In addition to receiving and processing data (e.g., rendering received audio data), nodes of a meshed network are sometimes required to act as a bridge or relay to spread data to other nodes. Such a network configuration increases the reachability of the individual nodes 602-608. The example mesh network 600 of FIG. 6 is configured according to a spanning tree protocol (STP). The spanning tree protocol is utilized by the example network 600 to implement a topology that does not include loops.

The spanning tree protocol implements bridge tables at each of the zone players 602-608 that each defines manners in which the response zone player communicates with other zone players of the network 600. The bridge tables of the STP can be stored locally on the zone players 602-608 and are updated when, for example, a zone player is added to the network 600, deleted from the network 600, and/or the network 600 is otherwise modified. In some examples, the network 600 automatically configures and/or reconfigures itself without input from a user. In such instances, the spanning tree protocol maintains a configuration that prevents looping communication of data. To prevent loops in the communication of data between the zone players 602-608, the bridge tables generated in accordance with the spanning tree protocol include entries or settings that block direct communication between two zone players. That is, the loop-preventing aspects of the spanning tree protocol sometimes force a communication path between two nodes to be bridged by an intermediary node. The two nodes for which direction routing communication is prohibited by the spanning tree protocol are referred to herein as "blocked" nodes.

FIG. 6 includes an example bridge table entry 614 of the fourth node 608 of the example network 600. While the example bridge table entry 614 of the fourth node 608 is shown in FIG. 6, each of the other nodes 602-606 include a similar (but differently configured) bridge table entry. In addition to the information shown in FIG. 6, the bridge tables of the nodes 602-608 may other information for routing and/or other purposes. Further, although shown as a single table 614 in the example of FIG. 6, the information of the example table 614 can be implemented in one or more tables (e.g., a bridge table and a forwarding table). The example bridge table entry 614 defines communication paths between the fourth node 608 and the other nodes 602-606 of the network 600. As the example nodes 602-608 of FIG. 6 correspond to zone players, the nodes 602-608 include communication ports that are each capable of establishing a link with another node. The link at each port can be wired or wireless in the example of FIG. 6. The example bridge table entry 614 maintains characteristics of the ports of the fourth node 608, thereby controlling the manner in which the fourth node 608 communicates data to and from the respective other nodes 602-606.

In the illustrated example, the bridge table 614 includes, for each interface of the fourth node 608, a port type, a local interface address, a remote interface address (e.g., remote MAC address), a port state, a remote port state, an identification of the remote node (e.g., remote Bridge ID), and a list of reachable nodes (e.g., a list of Bridge IDs) through the interface. The port type indicates whether the corresponding link is a wired link or a wireless link. In the example of FIG. 6, when the port type is a point-to-point (p2p) port, the corresponding communication link is a wireless link. Thus, the example bridge table entry 614 of FIG. 6 indicates that the fourth node is in or can be in wireless communication with each of the other nodes 602-606. Conversely, the bridge table entry of the second node (not shown) includes at least one port entry corresponding to the first node 602 that indicates a wired communication link.

The remote interface address (e.g., REMOTE INTERFACE) of the example bridge table entry 614 identifies the corresponding node by a destination address (e.g., a MAC address) of the corresponding node. The example bridge table entry 614 shows the remote interface address for each port with a name of the corresponding port. However, the name may be representative of a numerical network address. The remote interface information is used to direct a frame of data to the proper one of the interfaces of the proper one of the nodes 602-608. For example, when the fourth node 608 needs to forward data to the third node 606, the device represented by the fourth node 608 encapsulates the frame in a p2p header having a destination address set to the wireless remote interface address of the third node 606. As a result, as the frame of data traverses the network 600, the nodes that are forwarding the frame are aware of the destination of the frame.

The port state and the remote state information of the example bridge table entry 614 control whether or not the fourth node 608 can directly communication with the corresponding port. As mentioned above, the spanning tree protocol is implemented to prevent data from looping through the network 600. To do so, the spanning tree protocol blocks certain nodes from forwarding data directly to certain other nodes. For example, the bridge table 614 of FIG. 6 indicates that the fourth node is blocked from forwarding data directly to the second node 604. The fourth node 608 is also blocked from forwarding data directly to the third node 606. Further, the fourth node 608 is able to forward data directly to the first node 602 which, in the example of FIG. 6, is the root node of the network 100. Thus, if the fourth node 608 needs to transmit data to the third node 606, the data is routed from the fourth node 608 to the first node 602, and from the first node 602 to the third node 606. Similarly, if the fourth node 608 needs to transmit data to the second node 604, the data routed from the fourth node 608 to the first node 602, and from the first node 602 to the second node 604.

While such a configuration is useful for preventing looping of data and the drawbacks thereof, the blocking of the links enforced by the spanning tree protocol also results in longer communication paths for data. For example, the requirement of the fourth node 608 to route data to the third node 606 through the first node 602 is sometimes referred to as triangular routing. The triangular route between the fourth node 608 and the third node 606 is longer than a direct route or link between the fourth node 608 and the third node 606. Such a direct route is shown in the example of FIG. 6 as a direct wireless link 616. The example direct routing enabler 422 of FIG. 4 enables the direct route or link 616 of FIG. 6. As described in detail below, the example direct routing enabler 422 evaluates a plurality of conditions to determine whether the direct link 616 (and/or other direct links in the network 600) is to be utilized for particular frames and/or packets of data. That is, the example direct routing enabler 422 causes the fourth node 608, in certain circumstances, to override the blocking imposed by the network configuration protocol of the network 600. In such instances, the fourth node 608 bypasses the first node 602 and communicates directly with the third node 606 in contradiction with the settings of the bridge table entry 614. In some examples, the enablement of the direct link 616 is configured for some type(s) of data, such as audio data, and not for some type(s) of data, such as Internet data.

VI. Example Direct Communication

Figure 7:
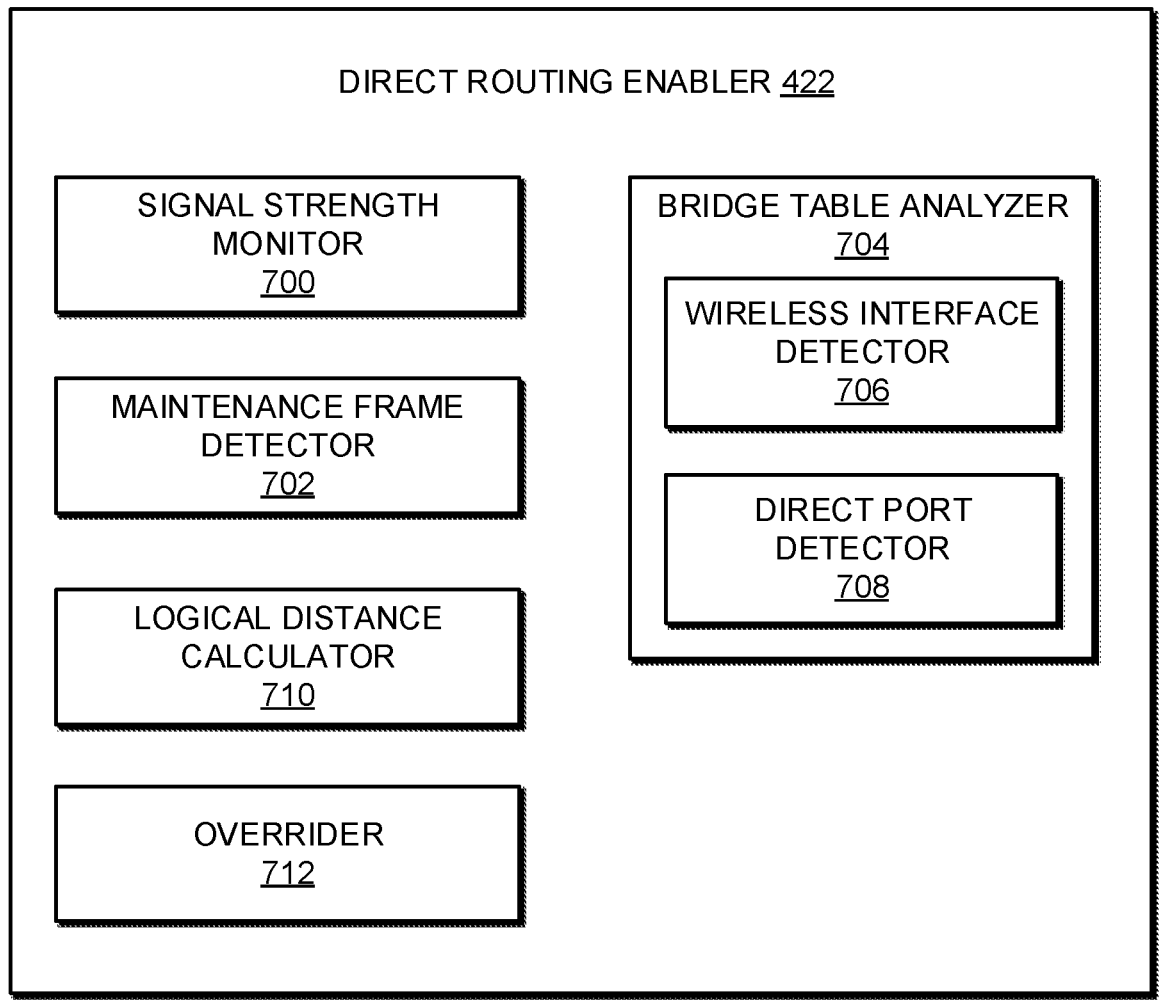
FIG. 7 shows an internal functional block diagram of the example direct routing enabler of FIG. 4.

FIG. 7 is an example implementation of the direct routing enabler 422 of FIG. 4. For purposes of illustration, the example direct routing enabler 422 of FIG. 7 is described below as implemented at the example fourth node 608 of FIG. 6. However, the example direct routing enabler 422 of FIGS. 4 and/or 7 can be implemented in any of the nodes 602-608 of FIG. 6 and/or other node(s) of alternative network(s). The example direct routing enabler 422 enables the example direct link 616 of FIG. 6 and/or any other direct link(s) between the nodes 602-608 of FIG. 6.

The example direct routing enabler 422 of FIG. 7 includes a signal strength monitor 700 to detect and/or evaluate quality and/or reliability of wireless communication links between the nodes 602-608. In the illustrated example, the nodes 602-608 undergo a learning phase when introduced into the network 600. When the example signal strength monitor 700 initially detects one of the other nodes 602-606, the example signal strength monitor 700 causes an entry to be added and populated in the bridge table entry 614. A program or application implementing the spanning tree protocol is executed to generate the settings to populate the new entry of the bridge table of the network 100. That is, the spanning tree protocol determines whether, for example, the detected node can communication directly with the fourth node 608. After the network configuration protocol information has been populated in the table 614, the example signal strength monitor 700 determines whether the wireless links of the table 614 have a strength (e.g., via remote signal strength indication (RSSI) monitoring) indicative of a high quality link. In other words, the example signal strength monitor 700 tests the wireless link(s) between fourth node 608 and the other nodes 602-606 to determine whether the wireless link(s) can be trusted for direction communication (e.g., routing audio data).

For each of the wireless ports of the table 614, the example signal strength monitor 700 enables direct communication (e.g., for the direct link 616 of FIG. 6) if the corresponding signal strength between the respective nodes is above a threshold. The threshold may be, for example, twenty-five dB. The enablement of direct communication for a certain port (e.g., the wireless interface port of the third node 606) is recorded via, for example, a flag in the corresponding entry of the bridge table 614 and/or any other data structure associated with the fourth node 608 and/or the network 100. Further, the example signal strength monitor 700 continues to monitor the signal strength of the wireless links. If the strength of a wireless link that has been enabled for direction communication drops below the threshold, the example signal strength monitor 700 of FIG. 7 disables the direction corresponding communication (e.g., by toggled the corresponding flag of the table 614). Thus, enablement of, for example, the direct link 616 of FIG. 6 can fluctuate depending on the signal strength of the wireless link between the fourth node 608 and the third node 606.

The example direct routing enabler 422 includes a maintenance frame detector 702 to determine whether a frame of data corresponding to network maintenance information. As described above, network configuration settings associated with, for example, the network 600 of FIG. 6 is updated on an on-going basis. To ensure that network configuration information is properly updated throughout the network 600, one or more of the nodes 602-608 periodically transmits maintenance frame(s). The periodicity of the maintenance frame(s) can be based on, for example, a maximum age value (e.g., which is a timer that controls the maximum length of time that passes before a bridge port saves configuration information) of a corresponding STP node. The maintenance frame(s) are to be routed through the network 600 according to the network protocol settings (e.g., the spanning tree protocol settings) regardless of an enabled direct communication link. For example, when the fourth node 608 receives a maintenance frame, the fourth node 608 routes the frame to the third node 606 (if the frame is directed to the third node 606) according to the "blocked" setting of the table 614. In other words, despite the enablement of the direct link 616 of FIG. 6, the fourth node 608 directs frame identified by the detector 702 as maintenance frames to the third node 606 via the first node 602. This ensures that the first node 602 is exposed to any network configuration updates intended for the first node 602 when the first node 602 may have otherwise been bypassed by the direct routing enabler 422.

Additional or alternative techniques can be utilized to ensure that network configuration information is properly updated throughout the network 600. For examples, the direct routing enabler 422 can disable the direct route provided thereby for a number of frames (e.g., one frame out of every one hundred frames). When the direct route is disabled, the frames are sent through the STP communication path. In such instances, if data arrives at one or more devices out of order, the data can be reassembled. Additionally or alternatively, the example direct routing enabler 422 and/or any other suitable component of the example zone player 400 can periodically send a duplicate frame through the STP communication path. In such instances, the duplicate frame can be discarded.

To determine whether received data (e.g., a packet of data, a frame of data, a group of packets, etc.) is to be directly communicated to a destination node despite a network protocol setting indicating that the data is to be indirectly communicated (e.g., via an intermediary node), the example direct routing enabler 422 includes a bridge table analyzer 704 having a wireless interface detector 706 and a direct port detector 708, a logical distance calculator 710, and an overrider 712. As the example direct routing enabler 422 receives frame(s) of data, the example bridge table analyzer 704 of FIG. 7 analyzes the table of the corresponding node of the network with respect to the received frame(s). In the illustrated example, when the fourth node 608 receives a data frame, the example bridge table analyzer 704 analyzes the example table 614 of FIG. 6. In particular, the example bridge table analyzer 704 determines what type of port the fourth node 608 is set to use for forwarding the received frame and whether or not a destination node of the frame is available to the fourth node 608 via a direct port (e.g., is a neighbor of the fourth node).

To determine what type of port the fourth node 608 will use to forward the frame, the example wireless interface detector 706 determines whether the appropriate forwarding port corresponds to a wired interface or a wireless interface. As the forwarding ports of the fourth node 608 are each a wireless interface, the wireless interface detector 706 determines that the appropriate forwarding port for the example received frame is a wireless port. However, another instance of the wireless interface detector 706, such as one associated with the second node 604 of FIG. 6, may determine that the appropriate forwarding port is a wired interface. In the example of FIG. 7, for the direct routing enabler 422 enables the direct communication disclosed herein (e.g., the direct link 616 of FIG. 6) when the appropriate forwarding port is determined to be a wireless link or interface. Further, the direct routing enabler 422 does not enable the direct communication disclosed herein when the appropriate forwarding port is determined to be a wired link or interface. To implement this configuration, the example wireless interface detector 706 generates an indication of its findings for the frames of data received at the direct routing enabler 422, which is used by the direct routing enabler 422 to activate and/or deactivate the direct links used to override a governing network protocol that is otherwise blocking the direct links.

The example direct port detector 708 extracts a destination address of the received frame of data (e.g., a from a frame header) to determine whether the destination node is directly accessible by the fourth node 608. That is, the example direct port detector 708 determines whether the receiving node has a direct link with the node at which the received frame is destined to be transmitted. In the illustrated example, the direct port detector 708 compares the destination address of the received frame to the remote Bridge ID of the bridge table entry 614. As described above, the bridge table entry 614 of the fourth node 608 includes a p2p entry for each node wirelessly sensed by the fourth node (e.g., via the signal strength monitor 700). Therefore, in the illustrated example, if the bridge table entry 614 includes an entry having a remote Bridge ID matching the destination address of the received frame, the direct port detector 708 determines that the fourth node 698 includes a direct link with the destination node of the received frame. In the example of FIG. 7, the direct routing enabler 422 enables the direct communication disclosed herein (e.g., the direct link 616 of FIG. 6) for frames of data when the node receiving the frames is in direct communication with the destination node of the frames. Further, the example direct routing enabler 422 of FIG. 7 does not enable the direct communication disclosed herein for frames of data when the node receiving the frames lacks a direct communication interface with the destination node of the frames. Therefore, the example direct port detector 708 generates an indication of its findings for the frames of data received at the direct routing enabler 422, which is used by the direct routing enabler 422 to activate and/or deactivate the direct links used to override a governing network protocol that is otherwise blocking the direct links.

Accordingly, for a frame of data received at the fourth node 608, the example bridge table analyzer 704 generates a first indication that the fourth node 608 uses (or does not use) a wireless interface (e.g., logical port) to forward the received frame, and a second indication that the fourth node 608 has (or does not have) a direct link with a destination node of the received frame.

The logical distance calculator 710 of the example direct routing enabler 422 of FIG. 7 determines whether received frames of data are "next-hop" frames. As used herein, a "next-hop" frame of data is one that is configured to arrive at its final destination node upon its next hop according to a governing network protocol that defines a communication path for the frame of data. In other words, if a network protocol (e.g., as defined by bridge tables in an STP network) indicates that the frame is set to not be forwarded by the next node in the corresponding communication path, the frame is designated as a "next-hop" frame. For example, the spanning tree protocol governing the example network 600 of FIG. 6 defines a communication path through the first node 602 for a frame of data at the fourth node 608 destined for (e.g., have a destination address of) the second node 604. Such a frame is not a "next-hop" frame while at the fourth node 608. However, the frame is a "next-hop" frame while at the first node 602 because the subsequent node in the STP communication path is the destination node (the second node 604).

To determine whether a received frame of data is a "next-hop" frame, the example logical distance calculator 710 analyzes the destination for the received frame to determine if there is a remote Bridge ID entry matching that destination in the bridge table. If the destination address of the frame is the next node in the communication path, the logical distance calculator 710 determines that the logical distance for the frame is one hop. On the other hand, the if the destination address of the frame is not the next node in the communication path, the logical distance calculator 710 determines that the logical distance for the frame is greater than one hop. In some examples, the logical distance calculator 710 determines whether the logical distance is or is not greater than one. That is, the example logical distance calculator 710 determines whether or not the logical distance of the frame to the destination node is greater than a threshold (e.g., one). Alternatively, the example logical distance calculator 710 can determine and/or record the number of hops.

When the example logical distance calculator 710 determines that the frame is a "next-hop" frame, the example direct routing enabler 422 does not enable the direct link disclosed herein because the governing network protocol that would overridden by the direct link already accomplishes the communication of the direct link. That is, enablement of the direct link (e.g., the link 616 of FIG. 6) would not bypass any intermediary node when the frame is a "next-hop" frame. Therefore, in such instances, the direct routing enabler 422 allows the governing protocol communication path to be followed. On the other hand, when the frame is not a "next-hop" frame, the example direct routing enabler 422 does enable the direct link disclosed herein. Thus, the example logical distance calculator 710 generates an indication of its findings for use by the direct routing enabler 422 in activating and/or deactivating the appropriate direct link(s).

The example overrider 712 of FIG. 7 receives information from the signal strength monitor 700, the maintenance frame detector 702, the bridge table analyzer 704, and the logical distance calculator 710 indicative of whether direct communication that contradicts the governing network protocol settings should be used in connection with a corresponding frame or frames of data. If the indications and/or detections described above in connection with the signal strength monitor 700, the maintenance frame detector 702, the bridge table analyzer 704, and the logical distance calculator 710 indicate that the direct communication should bypass the communication path defined in the governing network protocol (e.g., the bridge table entries 614), the example overrider 712 replaces a destination port of the frame(s) with the destination address of the frame(s). That is, when a received frame at the fourth node 608 is configured by the spanning tree protocol tables to be routed to the third node 606 via the first node 602, the frame is encapsulated in a p2p header having a destination address set to the wireless remote interface address corresponding to the first node 602 and a destination address in the original frame still corresponding to the third node 606. The example overrider 712 (when authorized to do so by the other components of the direct routing enabler 422) replaces the destination address in the encapsulated p2p header corresponding to the intermediary node (e.g., the first node 602) with the destination address set to the wireless remote interface address of the final node (e.g., the third node 606). Further, the example overrider 712 designates the frame as a special type of frame referred to herein as an "ether frame." An "ether frame" is one that the overrider 712 has manipulated to override or bypass the communication path defined by the spanning tree protocol tables. In some examples, the special type of frame designation prevents the destination node from updated the governing network protocol settings (e.g., table entries) based on frames that are received via the direct routing override disclosed herein. Further, the example overrider 712 does not alter the network protocol settings that define the spanning tree protocol communication path involving the fourth node 608. Instead, the frames of data are directly routed to the destination node without changing the settings of the governing network protocol.

Although the above description refers to unicast frames, which have a single destination address, the frames received at the nodes 602-608 can alternatively be multicast frames, which have a multi-cast group ID used for more than one destination address. For multicast frames, the example direct routing enabler 422 evaluates each of the destination addresses of the multicast group to determine whether a direct link should be used to communicate the data to respective nodes of the multicast frame. In some examples, the direct routing enabler 422 can enable a direct link for a first node of the multicast frame and not a second node of the multicast frame. Alternatively, the direct routing enabler 422 may require each of the destination nodes to qualify for a direct link.

While an example manner of implementing the direct routing enabler 422 of FIG. 4 has been illustrated in FIG. 7, one or more of the elements, processes and/or devices illustrated in FIG. 7 may be combined, divided, re-arranged, omitted, eliminated and/or implemented in any other way. Further, the example signal strength monitor 700, the example maintenance frame detector 702, the example bridge table analyzer 704, the example wireless interface detector 706, the example direct port detector 708, the example logical distance calculator 710, the example overrider 712, and/or, more generally, the example direct routing enabler 422 of FIG. 7 may be implemented by hardware, software, firmware and/or any combination of hardware, software and/or firmware. Thus, for example, any of the example signal strength monitor 700, the example maintenance frame detector 702, the example bridge table analyzer 704, the example wireless interface detector 706, the example direct port detector 708, the example logical distance calculator 710, the example overrider 712, and/or, more generally, the example direct routing enabler 422 of FIG. 7 could be implemented by one or more circuit(s), programmable processor(s), application specific integrated circuit(s) (ASIC(s)), programmable logic device(s) (PLD(s)) and/or field programmable logic device(s) (FPLD(s)), field programmable gate array (FPGA), etc. When any of the appended claims are read to cover a purely software and/or firmware implementation, at least one of the example signal strength monitor 700, the example maintenance frame detector 702, the example bridge table analyzer 704, the example wireless interface detector 706, the example direct port detector 708, the example logical distance calculator 710, the example overrider 712, and/or, more generally, the example direct routing enabler 422 of FIG. 7 are hereby expressly defined to include a tangible computer readable medium such as computer readable storage medium (e.g., a memory, DVD, CD, Bluray, etc. storing the software and/or firmware). Further still, the example direct routing enabler 422 of FIG. 7 may include one or more elements, processes and/or devices in addition to, or instead of, those illustrated in FIG. 7, and/or may include more than one of any or all of the illustrated elements, processes and devices.

Figure 8:
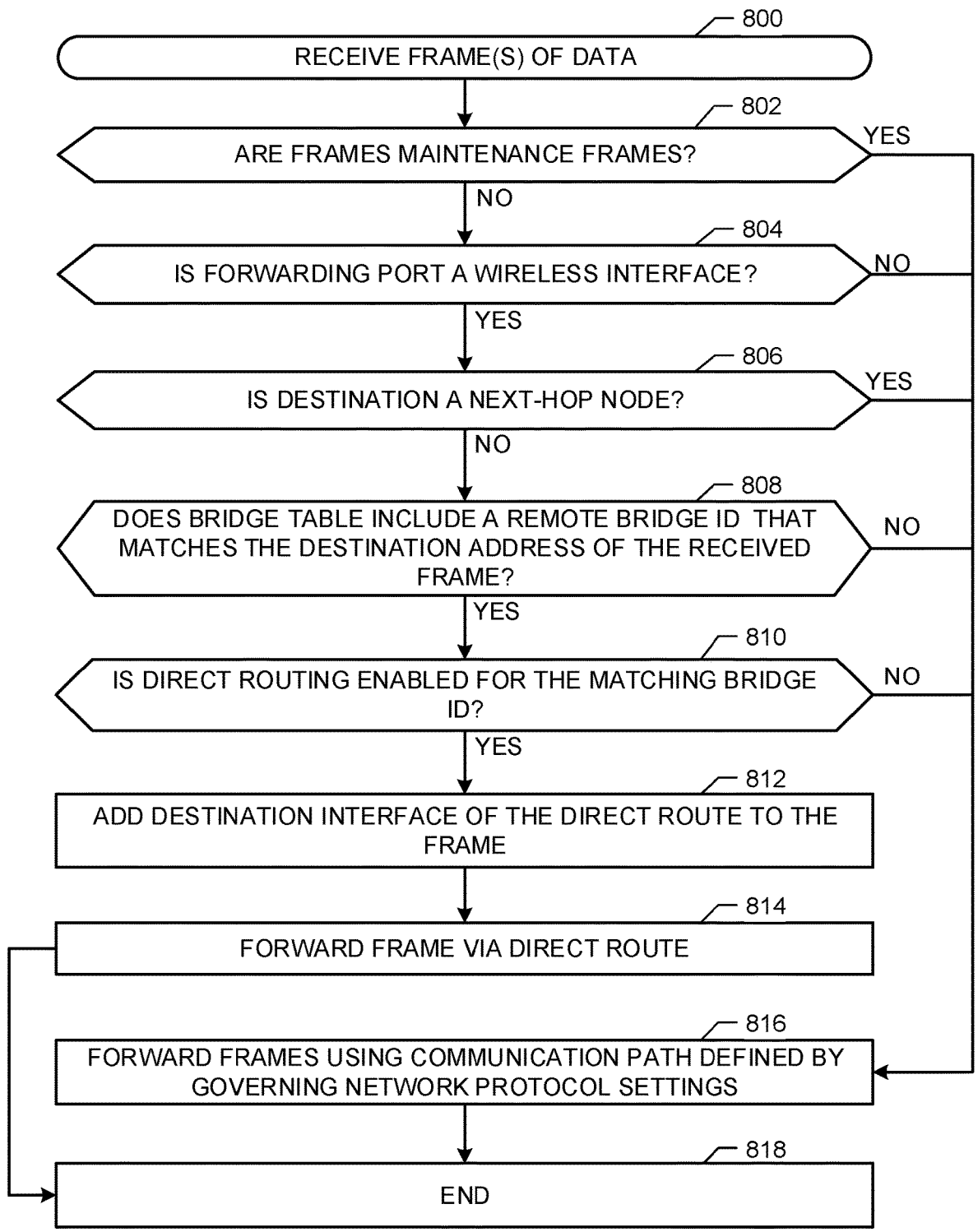
FIGS. 8 and 9 show flowcharts for example methods or processes for the example direction communication enabler of FIGS. 4 and/or 6.
Figure 9:
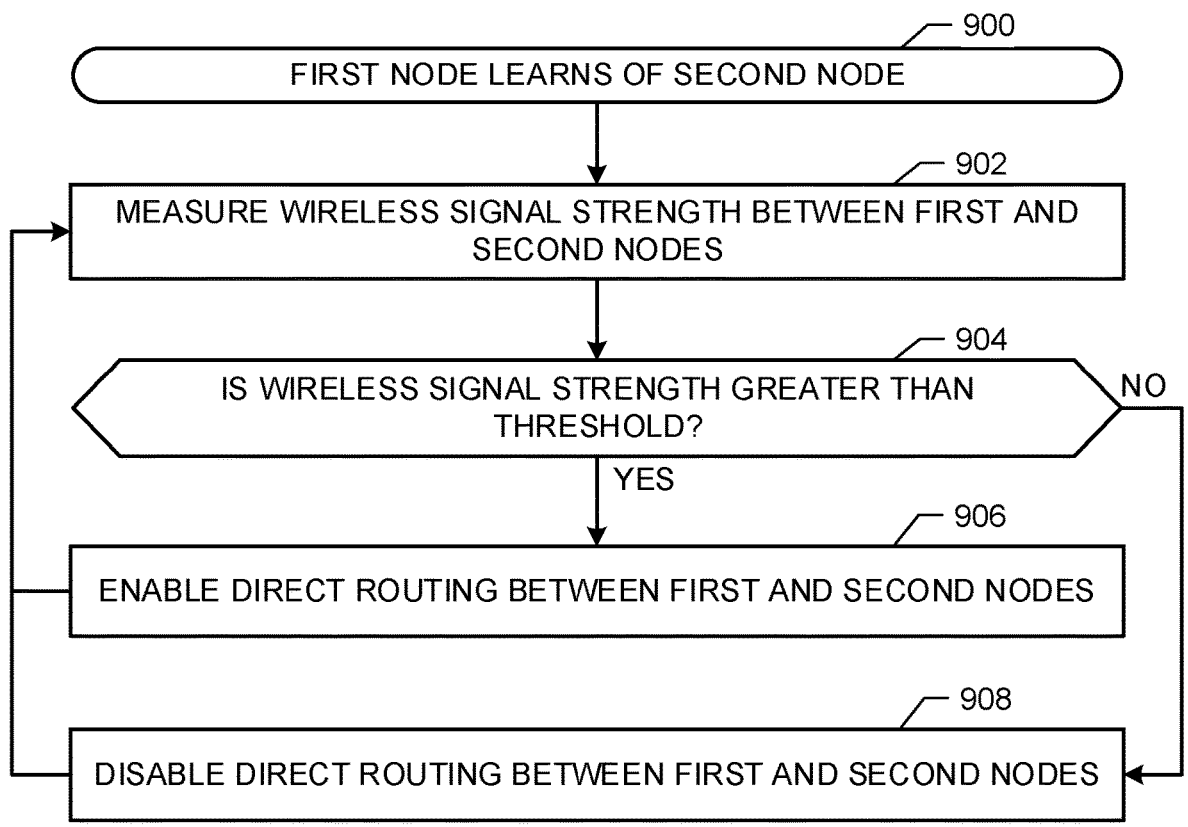

Flowcharts representative of example machine readable instructions for implementing the example direct routing enabler 422 of FIGS. 4 and/or 7 are shown in FIGS. 8 and 9. In the examples of FIGS. 8 and 9, the machine readable instructions comprise a program for execution by a processor such as the processor 408 of FIG. 4. The program may be embodied in software stored on a tangible computer readable medium such as a CD-ROM, a floppy disk, a hard drive, a digital versatile disk (DVD), a Blu-ray disk, or a memory associated with the processor 408, but the entire program and/or parts thereof could alternatively be executed by a device other than the processor 480 and/or embodied in firmware or dedicated hardware. Further, although the example programs are described with reference to the flowcharts illustrated in FIGS. 8 and 9, many other methods of implementing the example direct routing enabler 422 may alternatively be used. For example, the order of execution of the blocks may be changed, and/or some of the blocks described may be changed, eliminated, or combined.

As mentioned above, the example processes of FIGS. 8 and 9 may be implemented using coded instructions (e.g., computer readable instructions) stored on a tangible computer readable medium such as a computer readable storage medium (e.g., hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information)). As used herein, the term tangible computer readable storage medium is expressly defined to include any type of computer readable storage medium and to exclude propagating signals. Additionally or alternatively, the example processes of FIGS. 8 and 9 may be implemented using coded instructions (e.g., computer readable instructions) stored on a non-transitory computer readable storage medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable storage medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 8 begins with receipt of one or more frames of data, such as audio data, at one of the nodes 602-608 of FIG. 6 (block 800). The received frame(s) can be data packets, a single frame of data, a group of data packets, etc. For purposes of illustration, FIG. 8 is discussed with reference to the frame(s) of data being received at the fourth node 608 of FIG. 6. The example maintenance frame detector 702 (FIG. 7) determines whether the received frame(s) are maintenance frame(s) sent over the network 600 (FIG. 6) to maintain network configuration settings (block 802). If the maintenance frame detector 702 determines that the received frame(s) include a maintenance frame, the maintenance frame detector 702 generates an indication that the governing network protocol is to be used to forward the frame(s) and control proceeds to block 816. Otherwise, if the maintenance frame detector 702 determines that the received frame(s) do not include a maintenance frame, a corresponding indication is generated and control proceeds to block 804.

The example wireless interface detector 706 (FIG. 7) determines whether the forwarding port to be used by the fourth node 608 to forward the received frame(s) is a wireless interface (block 804). To do so, the example wireless interface detector 706 analyzes the bridge table entry 614 (FIG. 6) to determine whether the fourth node 608 forwards the received frame(s) via, for example, a p2p port, which is indicative of a wireless interface being utilized. If the wireless interface detector 706 determines that the forwarding port of the fourth node 608 is a wired wireless interface, the wireless interface detector 706 generates an indication that the governing network protocol is to be used to forward the frame(s) and control proceeds to block 816. Otherwise, if the wireless interface detector 706 determines that the forwarding port of the fourth node 608 is a wireless interface, a corresponding indication is generated and control proceeds to block 806.

The example logical distance calculator 710 (FIG. 7) determines whether the received frame(s) are "next-hop" frame(s) (block 806). To do so, the example logical distance calculator 710 calculates a number hops remaining in a communication path defined by the governing network protocol settings. If the logical distance calculator 710 determines that the received frame(s) are "next-hop" frame(s), the logical distance calculator 710 generates an indication that the governing network protocol is to be used to forward the frame(s) and control proceeds to block 816. Otherwise, if the logical distance calculator 710 determines that the received frame(s) are not "next-hop" frame(s), a corresponding indication is generated and control proceeds to block 808.

The example direct port detector 708 (FIG. 7) determines whether the bridge table entry 614 of the fourth node 608 includes a port with a bridge identifier (e.g., in the remote interface field) that matches the destination address of the received frame(s) (block 808). In other words, the example direct port detector 708 determines whether the destination node of the received frame(s) are neighbor(s) (e.g., accessible via a direct wireless communication without use of an intermediary node) of the fourth node 608. If the direct port detector 708 determines that the table 614 does not include a matching port, the direct port detector 708 generates an indication that the governing network protocol is to be used to forward the frame(s) and control proceeds to block 816. Otherwise, if the direct port detector 708 determines that the table 614 includes a matching port (e.g., that the fourth node 608 and the destination node are neighbors, a corresponding indication is generated and control proceeds to block 810.

An output of the example signal strength monitor 700 (FIG. 7) is checked to determine whether the direct link for bypassing the governing network protocol is enabled based on the signal strength of the wireless link between the fourth node 608 and the destination node of the received frame(s) (block 810). FIG. 9 illustrates an example implementation of block 810 of FIG. 8. The example of FIG. 9 begins when the signal strength monitor 700 and/or another learning component of a first node (e.g., the fourth node 608) learns of a second node in the network 600 (e.g., the third node 606) via wireless communication (e.g., by receiving RSSI data) (block 900). The example signal strength monitor measures the corresponding signal strength between the first node and the second node by, for example, calculating an average number of valid RSSI messages exchange between the first and second nodes over a period of time (block 902). If the measuring signal strength is greater than a threshold (e.g., twenty-five dB) (block 904), the signal strength monitor 700 enables direct communication between the first and second nodes (block 906). Otherwise, the signal strength monitor 700 disables direct routing between the first and second nodes (block 908). The example signal strength monitor 700 repeatedly (e.g., continuously) monitors the signal strength and updates the enablement or disablement of the direction communication accordingly. Thus, while the direct routing disclosed herein between two nodes may be enabled at a first time, the direct routing can be disabled and re-enabled at second and third times.

Referring back to FIG. 8, if the direct routing is not enabled (e.g., disabled) for the destination node of the received frame(s) (block 810), the signal strength monitor 700 generates an indication that the governing network protocol is to be used to forward the frame(s) and control proceeds to block 816. Otherwise, if the signal strength monitor 700 determines that the direct routing is enabled for the destination node, a corresponding indication is generated and control proceeds to block 812.

When control proceeds to block 812, the example overrider 712 sets the destination address to be the remote interface address of the destination address of the received frame (block 812). In some examples, the overrider 712 additionally designates the received frame(s) as a special type of frame (e.g., an ether frame) by, for example, setting a flag in the table 614 and/or another data structure associated with the corresponding frame(s) and/or node(s). With the overrider 712 having replaced the destination information of the received frame(s) to cause the direct routing thereof, the example director communication enabler 422 bypasses the communication path defined by the governing network protocol and, instead, forwards the received frame(s) directly to the destination node (block 814). Otherwise, if control has proceeded to block 816, the communication path defined by the governing network protocol (e.g., spanning tree protocol) is used to forward the received frame(s) (block 816). The example of FIG. 8 then ends (block 818).

Various inventions have been described in sufficient detail with a certain degree of particularity. It is understood to those skilled in the art that the present disclosure of embodiments has been made by way of examples only and that numerous changes in the arrangement and combination of parts can be resorted without departing from the spirit and scope of the present disclosure as claimed. While the embodiments discussed herein can appear to include some limitations as to the presentation of the information units, in terms of the format and arrangement, the embodiments have applicability well beyond such embodiment, which can be appreciated by those skilled in the art. Accordingly, the scope of the present disclosure is defined by the appended claims rather than the forgoing description of embodiments.

The invention claimed is:

1. A first playback device comprising:
   at least one processor;
   at least one audio amplifier;
   a tangible, non-transitory computer-readable medium; and
   program instructions stored on the tangible, non-transitory computer-readable medium that are executable by the at least one processor such that the first playback device is configured to:
   identify a set of wireless communication paths between the first playback device and a second playback device that are available for communication between the first playback device and the second playback device;
   based at least on a wireless signal strength between the first playback device and the second playback device, determine that a second wireless communication path, and not a first wireless communication path, from the identified set of wireless communication paths is to be used for communication between the first playback device the second playback device;
join a synchrony group comprising the first playback device and the second playback device;
obtain audio content that is to be played back in synchrony by the synchrony group;
begin transmitting the audio content to the second playback device over the second wireless communication path;
play back, using the at least one audio amplifier, the audio content; and
cause the second playback device to play back the audio content in synchrony with the playback of the audio content by the first playback device.

2. The first playback device of claim 1, wherein the program instructions that are executable by the at least one processor such that the first playback device is configured to determine that the second wireless communication path is to be used for communication between the first playback device and the second playback device comprise program instructions that are executable by the at least one processor such that the first playback device is configured to:
determine that the wireless signal strength between the first playback device and the second playback device meets a quality threshold.

3. The first playback device of claim 2, wherein the second wireless communication path between the first playback device and the second playback device is a direct wireless communication path.

4. The first playback device of claim 1, wherein the first wireless communication path is an indirect wireless communication path that traverses at least one computing device between the first and second playback devices and the second wireless communication path is a direct wireless communication path between the first and second playback devices, the first playback device further comprising program instructions that are executable by the at least one processor such that the first playback device is configured to:
monitor the wireless signal strength between the first playback device and the second playback device;
determine a change in the wireless signal strength between the first playback device and the second playback device such that the wireless signal strength does not meet a quality threshold;
based on the change in the wireless signal strength, determine that the indirect wireless communication path, and not the direct wireless communication path, is to be used for communication between the first playback device and the second playback device;
cease transmitting the audio content to the second playback device over the direct wireless communication path; and
begin transmitting the audio content to the second playback device over the indirect wireless communication path.

5. The first playback device of claim 4, wherein the at least one computing device comprises a third playback device.

6. The first playback device of claim 4, wherein the synchrony group further comprises a third playback device, the first playback device further comprising program instructions that are executable by the at least one processor such that the first playback device is configured to:
identify a second set of wireless communication paths between the first playback device and the third playback device that are available for communication between the first playback device and the third playback device;
based at least on a respective wireless signal strength between the first playback device and the third playback device, determine that a fourth wireless communication path, and not a third wireless communication path, from the second set of wireless communication paths is to be used for communication between the first playback device and the third playback device;
begin transmitting the audio content to the third playback device over the fourth wireless communication path, wherein the fourth wireless communication path is a direct wireless communication path and the third wireless communication path is an indirect wireless communication path that traverses at least one computing device between the first and third playback devices; and
cause the third playback device to play back the audio content in synchrony with the playback of the audio content by the first playback device and the second playback device.

7. The first playback device of claim 1, wherein the wireless signal strength is based on an average number of remote signal strength indicator (RSSI) messages exchanged between the first and second playback devices.

8. The first playback device of claim 1, wherein the first playback device is located in a first zone of a media playback system, and wherein the second playback device is located in a second zone of the media playback system.

9. The first playback device of claim 1, wherein the first playback device and the second playback device are respective wireless mesh nodes of a media playback system that is configured to operate in a wireless mesh network.

10. A first mesh network device comprising:
at least one processor;
at least one audio amplifier;
a tangible, non-transitory computer-readable medium; and
program instructions stored on the tangible, non-transitory computer-readable medium that are executable by the at least one processor such that the first mesh network device is configured to:
identify a set of wireless communication paths between the first mesh network device and a second mesh network device that are available for communication between the first mesh network device and the second mesh network device;
based at least on a wireless signal strength between the first mesh network device and the second mesh network device, determine that a second wireless communication path, and not a first wireless communication path, from the identified set of wireless communication paths is to be used for communication between the first mesh network device the second mesh network device;
join a synchrony group comprising the first mesh network device and the second mesh network device;
obtain audio content that is to be played back in synchrony by the synchrony group;
begin transmitting the audio content to the second mesh network device over the second wireless communication path;
play back, using at least one audio amplifier of the first mesh network device, the audio content; and
cause the second mesh network device to play back the audio content in synchrony with the playback of the audio content by the first mesh network device.

11. The first mesh network device of claim 10, wherein the program instructions that are executable by the at least one processor such that the first mesh network device is configured to determine that the second wireless communication path is to be used for communication between the first mesh network device and the second mesh network device comprise program instructions that are executable by the at least one processor such that the first mesh network device is configured to:
   determine that the wireless signal strength between the first mesh network device and the second mesh network device meets a quality threshold.

12. The first mesh network device of claim 11, wherein the second wireless communication path between the first mesh network device and the second mesh network device is a direct wireless communication path.

13. The first mesh network device of claim 10, wherein the first wireless communication path is an indirect wireless communication path that traverses at least one computing device between the first and second mesh network devices and the second wireless communication path is a direct wireless communication path between the first and second mesh network devices, the first mesh network device further comprising program instructions that are executable by the at least one processor such that the first mesh network device is configured to:
   monitor the wireless signal strength between the first mesh network device and the second mesh network device;
   determine a change in the wireless signal strength between the first mesh network device and the second mesh network device such that the wireless signal strength does not meet a quality threshold;
   based on the change in the wireless signal strength, determine that the indirect wireless communication path, and not the direct wireless communication path, is to be used for communication between the first mesh network device and the second mesh network device;
   cease transmitting the audio content to the mesh network device over the direct wireless communication path; and
   begin transmitting the audio content to the second mesh network device over the indirect wireless communication path.

14. The first mesh network device of claim 13, wherein the at least one computing device comprises a third mesh network device.

15. The first mesh network device of claim 13, wherein the synchrony group further comprises a third mesh network device, the first mesh network device further comprising program instructions that are executable by the at least one processor such that the first mesh network device is configured to:
   identify a second set of wireless communication paths between the first mesh network device and the third mesh network device that are available for communication between the first mesh network device and the third mesh network device;
   based at least on a respective wireless signal strength between the first mesh network device and the third mesh network device, determine that a fourth wireless communication path, and not a third wireless communication path, from the second set of wireless communication paths is to be used for communication between the first mesh network device and the third mesh network device;
   begin transmitting the audio content to the third mesh network device over the fourth wireless communication path, wherein the fourth wireless communication path is a direct wireless communication path and the third wireless communication path is an indirect wireless communication path that traverses at least one computing device between the first and third mesh network devices; and
   cause the third mesh network device to play back the audio content in synchrony with the playback of the audio content by the first mesh network device and the second mesh network device.

16. A tangible, non-transitory computer-readable medium, wherein the tangible, non-transitory computer-readable medium is provisioned with program instructions that, when executed by at least one processor, cause a first mesh network device to:
   identify a set of wireless communication paths between the first mesh network device and a second mesh network device that are available for communication between the first mesh network device and the second mesh network device;
   based at least on a wireless signal strength between the first mesh network device and the second mesh network device, determine that a second wireless communication path, and not a first wireless communication path, from the identified set of wireless communication paths is to be used for communication between the first mesh network device the second mesh network device;
   join a synchrony group comprising the first mesh network device and the second mesh network device;
   obtain audio content that is to be played back in synchrony by the synchrony group;
   begin transmitting the audio content to the second mesh network device over the second wireless communication path;
   play back, using at least one audio amplifier of the first mesh network device, the audio content; and
   cause the second mesh network device to play back the audio content in synchrony with the playback of the audio content by the first mesh network device.

17. The non-transitory computer-readable medium of claim 16, wherein the program instructions that, when executed by at least one processor, cause the first mesh network device to determine that the second wireless communication path is to be used for communication between the first mesh network device and the second mesh network device comprise program instructions that, when executed by at least one processor, cause the first mesh network device to:
   determine that the wireless signal strength between the first mesh network device and the second mesh network device meets a quality threshold.

18. The non-transitory computer-readable medium of claim 16, wherein the second wireless communication path between the first mesh network device and the second mesh network device is a direct wireless communication path.

19. The non-transitory computer-readable medium of claim 16, wherein the first wireless communication path is an indirect wireless communication path that traverses at least one computing device between the first and second mesh network devices and the second wireless communication path is a direct wireless communication path between the first and second mesh network devices, and wherein the non-transitory computer-readable medium is also provisioned with program instructions that, when executed by at least one processor, cause the first mesh network device to:

monitor the wireless signal strength between the first mesh network device and the second mesh network device;

determine a change in the wireless signal strength between the first mesh network device and the second mesh network device such that the wireless signal strength does not meet a quality threshold;

based on the change in the wireless signal strength, determine that the indirect wireless communication path, and not the direct wireless communication path, is to be used for communication between the first mesh network device and the second mesh network device;

cease transmitting the audio content to the mesh network device over the direct wireless communication path; and begin transmitting the audio content to the second mesh network device over the indirect wireless communication path.

20. The non-transitory computer-readable medium of claim 19, wherein the synchrony group further comprises a third mesh network device, and wherein the first mesh network device is also provisioned with program instructions that, when executed by at least one processor, cause the first mesh network device to:

identify a second set of wireless communication paths between the first mesh network device and the third mesh network device that are available for communication between the first mesh network device and the third mesh network device;

based at least on a respective wireless signal strength between the first mesh network device and the third mesh network device, determine that a fourth wireless communication path, and not a third wireless communication path, from the second set of wireless communication paths is to be used for communication between the first mesh network device and the third mesh network device;

begin transmitting the audio content to the third mesh network device over the fourth wireless communication path, wherein the fourth wireless communication path is a direct wireless communication path and the third wireless communication path is an indirect wireless communication path that traverses at least one computing device between the first and third mesh network devices; and cause the third mesh network device to play back the audio content in synchrony with the playback of the audio content by the first mesh network device and the second mesh network device.

* * * * *